United States Patent
Ellis

(10) Patent No.: US 8,263,718 B2
(45) Date of Patent: *Sep. 11, 2012

(54) METHOD OF FREE RADICALLY POLYMERIZING VINYL MONOMERS

(75) Inventor: Mark F. Ellis, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/159,515

(22) Filed: Jun. 14, 2011

(65) Prior Publication Data

US 2011/0245437 A1 Oct. 6, 2011

Related U.S. Application Data

(63) Continuation of application No. 11/275,165, filed on Dec. 16, 2005, now Pat. No. 7,989,573.

(51) Int. Cl.
| | |
|---|---|
| C08F 2/00 | (2006.01) |
| C08F 20/06 | (2006.01) |
| C08F 118/02 | (2006.01) |
| C08F 16/12 | (2006.01) |
| C08F 218/02 | (2006.01) |
| C08F 12/02 | (2006.01) |
| C08F 212/06 | (2006.01) |
| C08F 16/16 | (2006.01) |

(52) U.S. Cl. ............... 526/222; 526/317.1; 526/319; 526/330; 526/346; 526/332; 526/347; 526/334

(58) Field of Classification Search .............. 526/222, 526/317.1, 319, 330, 346, 347, 332, 334
See application file for complete search history.

(56) References Cited

U.S. PATENT DOCUMENTS

| | | | |
|---|---|---|---|
| 3,786,116 A | 1/1974 | Milkovich et al. | |
| 3,842,059 A | 10/1974 | Milkovich et al. | |
| 4,181,752 A | 1/1980 | Martens et al. | |
| 4,732,808 A | 3/1988 | Krampe et al. | |
| 4,737,559 A | 4/1988 | Kellen et al. | |
| 4,737,577 A | 4/1988 | Brown | |
| 4,826,901 A | 5/1989 | Ittmann et al. | |
| 5,266,402 A | 11/1993 | Delgado et al. | |
| 5,407,971 A | 4/1995 | Everaerts et al. | |
| 5,637,646 A | 6/1997 | Ellis | |
| 5,741,542 A | 4/1998 | Williams et al. | |
| 5,753,768 A | 5/1998 | Ellis | |
| 5,795,650 A | 8/1998 | Watanabe et al. | |
| 5,986,011 A | 11/1999 | Ellis | |
| 6,127,002 A | 10/2000 | Callahan, Jr. et al. | |
| 6,136,807 A | 10/2000 | Braun | |
| 6,232,366 B1 | 5/2001 | Wang et al. | |
| 6,479,073 B1 * | 11/2002 | Lucast et al. | ............... 424/448 |
| 6,624,273 B1 | 9/2003 | Everaerts et al. | |
| 6,673,892 B2 | 1/2004 | Martinez et al. | |
| 6,927,267 B1 | 8/2005 | Varela de la Rosa et al. | |
| 7,968,661 B2 * | 6/2011 | Ellis et al. | ............... 526/222 |
| 7,989,573 B2 * | 8/2011 | Ellis | ............... 526/317.1 |
| 2003/0051807 A1 | 3/2003 | Yamaguchi et al. | |
| 2005/0095370 A1 | 5/2005 | Ellis et al. | |
| 2005/0208298 A1 | 9/2005 | Neubert et al. | |
| 2006/0205835 A1 | 9/2006 | Husemann et al. | |

FOREIGN PATENT DOCUMENTS

| | | |
|---|---|---|
| DE | 102 59 460 | 7/2004 |
| EP | 1 433 829 A1 | 6/2004 |
| JP | 6-287529 | 10/1994 |
| JP | 10-87740 | 4/1998 |
| KR | 10-1995-18080 | 7/1995 |
| WO | WO 00/75255 A2 | 12/2000 |
| WO | WO 2005/003185 A1 | 1/2005 |

OTHER PUBLICATIONS

Ray, "On the Mathematical Modeling of Polymerization Reactors", *Journal of Macromolecular Science—Reviews in Macromolecular Chemistry*, vol. C 8, No. 1, (1972), pp. 1-56.

Schulz et al., "Functionally Terminal Polymers via Anionic Methods", Anionic Polymerization: Kinetics, Mechanisms, and Synthesis, ACS Symposium Series 166, (1981), pp. 427-440, vol. 27, American Chemical Society, Washington, DC.

* cited by examiner

*Primary Examiner* — William Cheung
(74) *Attorney, Agent, or Firm* — James A. Baker

(57) ABSTRACT

A method for the polymerization of free radically polymerizable vinyl monomers involves polymerizing free radically (co)polymerizable vinyl monomers in a batch reaction under essentially adiabatic conditions, and utilizing scavenger monomer to reduce undesirable residual monomer.

20 Claims, No Drawings

METHOD OF FREE RADICALLY POLYMERIZING VINYL MONOMERS

CROSS REFERENCE TO RELATED APPLICATIONS

This application is a continuation of U.S. application Ser. No. 11/275,165, filed Dec. 16, 2005, issued as U.S. Pat. No. 7,989,573, the disclosure of which is incorporated by reference in its entirety herein.

FIELD

This invention relates to a method of free radically polymerizing vinyl monomers in a batch reactor.

BACKGROUND (Co)polymers of vinyl monomers (for example, copolymers of isooctyl acrylate or other high boiling acrylates with acrylic acid or acrylamide) often contain residual monomer in the final polymerized product. Residual monomer in the final polymerized product is undesirable, however, because it can give off unpleasant odors, or potentially be toxic or corrosive. Although polymerizations can be carried to extremes where conversions of monomer starting materials ("primary monomer") to copolymer are above 95%, it is almost impossible to eliminate all unreacted primary monomer during the initial reaction. In addition, unreacted primary monomers are not easily removed by volatilization because of their low volatility.

Scavenger monomers are sometimes added to copolymerize with residual primary monomer when polymerization of the primary monomers is substantially complete (that is, at least about 80% complete) in order to lower the level of residual primary monomer (see, for example, U.S. Pat. No. 4,737,577).

SUMMARY

In view of the foregoing, we recognize that there is a need for methods of making (co)polymers of vinyl monomers with reduced levels of residual monomer.

The present invention provides a method of free radically polymerizing vinyl monomers. The method employs certain scavenger monomers to reduce the undesirable residual primary monomer content in the final polymerized product. The method comprises:

(a) providing a non-heterogeneous mixture compromising (i) free radically (co)polymerizable vinyl monomers, (ii) at least one thermal free radical initiator, and (iii) optional scavenger monomer, in a batch reactor, wherein the mixture comprises less than about 20% by weight dissolved solvent;

(b) deoxygenating the mixture if the mixture is not already deoxygenated;

(c) heating the mixture to a sufficient temperature to generate sufficient initiator radicals from at least one thermal free radical initiator so as to initiate polymerization;

(d) allowing the mixture to polymerize under essentially adiabatic conditions to yield an at least partially polymerized mixture;

(e) adding additionally to the at least partially polymerized mixture at least one thermal free radical initiator;

(f) deoxygenating the partially polymerized mixture if the mixture is not already deoxygenated; and (g) allowing the partially polymerized mixture to further polymerize under essentially adiabatic conditions to yield a further polymerized mixture wherein scavenger monomer is added additionally to the at least partially polymerized mixture of step (d) if the non-heterogeneous mixture of step (a) does not comprise scavenger monomer;

wherein scavenger monomer is optionally added additionally to the at least partially polymerized mixture of step (d) if the non-heterogeneous mixture of step (a) comprises scavenger monomer; and wherein the scavenger monomer (1) reacts more preferably with the free radically (co)polymerizable vinyl monomers than with itself, and (2) reacts more slowly than the free radically (co)polymerizable vinyl monomers.

The method of the invention is advantageously carried out in a batch (that is, non-continuous) reactor. Although industrially important, batch reactors are used less frequently for bulk (that is, mass) free-radical polymerization than continuous processes.

Bulk free-radical polymerization of pure monomer typically involves high heat of reaction, increasing solution viscosity as polymerization progresses, and the corresponding decrease in heat transfer coefficient of the reacting material. Because of these problems, controlling the temperature of bulk polymerization processes can be extremely difficult. Bulk free-radical polymerization heat transfer difficulties can often be managed in continuous process. For example, reactive extrusion and continuous static mixer reactors are both useful bulk polymerization processes because of high heat transfer capability due to large heat transfer areas per unit reacting volume.

The prime difficulty with batch reactors is that heat transfer per unit reacting volume is poor and becomes increasingly poor with larger reactor size. But, batch reactors are desirable over continuous reactors in certain circumstances. For example, a specialty chemical manufacturer tends to produce multiple products. In this case, batch reactors can be beneficial because of their multipurpose nature. In addition, the economics of a batch reactor can be favorable over that for a continuous process because of the relative simplicity batch reactor equipment.

With the method of the invention, bulk free radical polymerization of vinyl monomers can be carried out in a batch reactor because the present invention makes use of appropriately chosen free radical initiator(s) and reacting in essentially adiabatic conditions rather than the conventional approach of directly controlling the reaction temperature.

As defined herein, by "essentially adiabatic" it is meant that total of the absolute value of any energy exchanged to or from the batch during the course of reaction will be less than about 15% of the total energy liberated due to reaction for the corresponding amount of polymerization that has occurred during the time that polymerization has occurred. Expressed mathematically, the essentially adiabatic criterion is:

$$\int_{t_1}^{t_2} \sum_{j=1}^{N} |q_j(t)|\, dt \le f \cdot \int_{x_1}^{x_2} \Delta H_p(x)\, dx \tag{1}$$

where f is about 0.15, $\Delta H_p$ is the heat of polymerization, x=monomer conversion=$(M_O-M)/M_O$ where M is the concentration of the monomer and $M_O$ is the initial monomer concentration, $x_1$ is the polymer fraction at the start of the reaction and $x_2$ is the polymer fraction due to polymerization at the end of the reaction, t is the time. $t_1$ is the time at the start of reaction, $t_2$ is the time at the end of reaction, and $q_j(t)$, wherein j=1 . . . N is the rate of energy transferred to the reacting system from the surroundings from all N sources of energy flow into the system. Examples of energy transfer sources for $q_j(t)$, wherein j=1 . . . N include, but are not limited to, heat energy conducted to or from the batch from the reactor jacket, energy required to warm internal components in the reaction equipment such as the agitator blades and shaft, and work energy introduced from mixing the reacting mixture. In the practice of the present invention, having f as close to zero as possible is preferred to maintain uniform conditions within a batch during a reaction (that is, maintain homogeneous temperature conditions throughout a batch) which helps to minimize batch-to-batch variations in a particular piece of equipment as well as minimize batch-to-batch variations when reactions are made in batch reactors of differing sizes (that is, uniform scale up or scale down of reaction).

As disclosed herein, when appropriately polymerized, essentially adiabatic bulk free-radical runaway polymerization in a batch reactor can present several advantages: (1) When adiabatically polymerized, because the reaction equipment is not being used to cool the reacting mixture, there is not a significant temperature gradient at the walls of the reaction equipment. Such a temperature gradient can detrimentally broaden the molecular weight distribution of the polymer by making high molecular weight product in the cold boundary layer near the reactor wall, because of the free-radical reaction kinetics well known to those skilled in the art. For example, such high molecular weight components can degrade the coating performance of a hot-melt adhesive. (2) The reaction equipment utilized according to the method of the present invention is simple. (3) Because heat transfer requirements during reaction are eliminated, the method of the present invention more readily scales up from lab-scale equipment to large production-scale equipment than temperature-controlled polymerization methods that rely on available heat transfer area to control reaction temperature. (4) Continuous polymerization reaction equipment contain various degrees of "backmixing" where there is a residence time distribution of the reacting material in the reaction equipment. Some of the reacting material can remain in the reaction equipment for extended periods of time to degrade product performance by continued attack by the free-radical initiator to form cross-linked polymer. Crosslinked gel particles can degrade product performance, such as the coating smoothness of a hot-melt adhesive.

As used herein, a "reaction cycle" is defined as a processing sequence where initiator(s), monomers (which are not optional in the first reaction cycle, but which may be optional in subsequent reaction cycle), scavenger monomer (which can be added in the first reaction cycle, a subsequent reaction cycle, or both), and optional component(s) are added to the batch followed by one or more essentially adiabatic reactions with optional heating between the essentially adiabatic reactions.

DETAILED DESCRIPTION

Batch Reactor

A batch reactor is used in the method of the present invention. By reacting batch wise is meant that the polymerization reaction occurs in a vessel where product is drained at the end of the reaction, not continuously while reacting. The raw materials can be charged to the vessel at one time prior to reacting, in steps over time while reacting, or continuously over a time period while reacting, and the reaction is allowed to proceed for the necessary amount of time to achieve, in this case, polymer properties including the desired polymerization amount, molecular weight, etc. If necessary, additives can be mixed into the batch prior to draining. When the processing is complete, the product is drained from the reaction vessel.

A typical batch reactor for this invention will comprise a pressure vessel constructed of material suitable for the polymerization, such as stainless steel, which is commonly used for many types of free-radical polymerization. Typically, the pressure vessel will have ports for charging raw materials, removing product, emergency pressure relief, pressurizing the reactor with inert gas, pulling vacuum on the reactor head space, etc. Typically, the vessel is enclosed partially in a jacket through which a heat transfer fluid (such as water) is passed for heating and cooling the contents of the vessel. Typically, the vessel contains a stirring mechanism such as a motor-driven shaft inserted into the vessel to which stirring blades are attached. Commercial batch reaction equipment typically is sized in the range of about 10 to about 20,000 gallons (37.9 to 75,708 liters), and can be custom-built by the user or can be purchased from vendors.

Free-Radically Polymerizable Vinyl Monomers

A variety of free radically polymerizable monomers can be used according to the method of the present invention. Typical monomers applicable for this invention include, but are not limited to, those acrylate monomers commonly used to produce acrylate pressure sensitive adhesives (PSA). The identity and relative amounts of such components are well known to those skilled in the art. Particularly preferred among acrylate monomers are alkyl acrylates, preferably a monofunctional unsaturated acrylate ester of a non-tertiary alkyl alcohol, wherein the alkyl group contains 1 to about 18 carbon atoms. Included within this class of monomers are, for example, isooctyl acrylate, isononyl acrylate, 2-ethylhexyl acrylate, decyl acrylate, dodecyl acrylate, n-butyl acrylate, hexyl acrylate, octadecyl acrylate, 2-methyl butyl acrylate, and mixtures thereof.

Optionally and preferably in preparing a PSA, polar copolymerizable monomers can be copolymerized with the acrylate monomers to improve adhesion of the final adhesive composition to metals and also improve cohesion in the final adhesive composition. Strongly polar and moderately polar copolymerizable monomers can be used.

Strongly polar copolymerizable monomers include but are not limited to these selected from the group consisting of acrylic acid, itaconic acid, hydroxyalkyl acrylates, cyanoalkyl acrylates, acrylamides, substituted acrylamides, and mixtures thereof. A strongly polar copolymerizable monomer preferably constitutes a minor amount, for example, up to about 25 weight % of the monomer, more preferably up to about 15 weight %, of the monomer mixture. When strongly polar copolymerizable monomers are present, the alkyl acrylate monomer generally constitutes a major amount of the monomers in the acrylate-containing mixture, for example, at least about 75% by weight of the monomers.

Moderately polar copolymerizable monomers include, but are not limited to, those selected from the group consisting of N-vinyl pyrrolidone, N,N-dimethyl acrylamide, acrylonitrile, vinyl chloride, diallyl phthalate, and mixtures thereof. A moderately polar copolymerizable monomer preferably constitutes a minor amount, for example, up to about 40 weight %, more preferably from about 5 weight % to about 40 weight %, of the monomer mixture. When moderately polar copolymerizable monomers are present, the alkyl acrylate monomer generally constitutes at least about 60 weight % of the monomer mixture.

Macromonomers are another monomer useful herein. Described in U.S. Pat. No. 4,732,808, incorporated by reference herein, is the use of free-radically copolymerizable macromonomers having the general formula X—(Y)$_n$—Z wherein X is a vinyl group copolymerizable with other monomer(s) in the reaction mixture;

Y is a divalent linking group; where n can be zero or one; and

Z is a monovalent polymeric moiety having a glass transition temperature, $T_g$, greater than about 20° C., and a weight average molecular weight in the range of about 2,000 to about 30,000 and being essentially unreactive under copolymerization conditions.

These macromonomers are generally used in mixtures with other (co)polymerizable monomer(s). A preferred macromonomer described in U.S. Pat. No. 4,732,808 can be further defined as having an X group which has the general formula

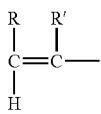

wherein R is a hydrogen atom or a —COOH group and R' is a hydrogen atom or methyl group. The double bond between the carbon atoms provides a copolymerizable moiety capable of copolymerizing with the other monomer(s) in the reaction mixture.

A preferred macromonomer includes a Z group which has the general formula

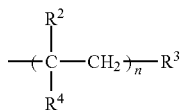

wherein $R^2$ is a hydrogen atom or a lower alkyl group (typically $C_1$ to $C_4$), $R^3$ is a lower alkyl group (typically $C_1$ to $C_4$), n is an integer from 20 to 500 and $R^4$ is a monovalent radical selected from the group consisting of

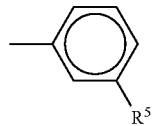

and —$CO_2R^6$ wherein $R^5$ is a hydrogen atom or a lower alkyl group (typically $C_1$ to $C_4$) and $R^6$ is a lower alkyl group (typically $C_1$ to $C_4$).

Preferably, the macromonomer has a general formula selected from the group consisting of

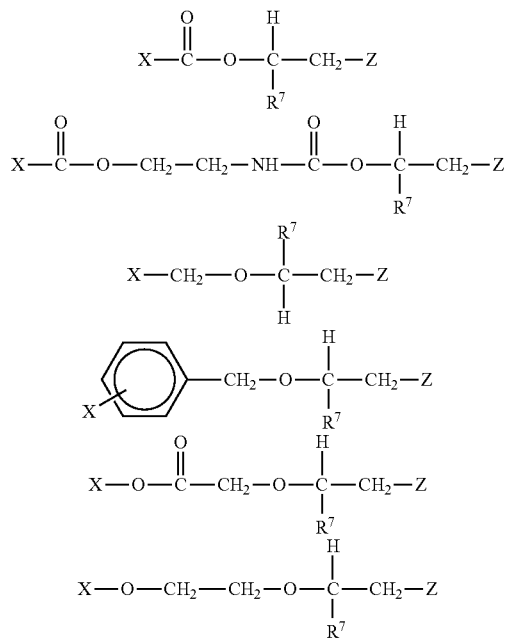

wherein $R^7$ is a hydrogen atom or lower alkyl group (typically $C_1$ to $C_4$).

Preferred macromonomers are functionally terminated polymers having a single functional group (the vinyl group) and are sometimes identified as "semitelechelic" polymers. (Vol. 27 "Functionally Terminal Polymers via Anionic Methods" D. N. Schultz et al., pages 427-440, *Anionic Polymerization*, American Chemical Society [1981].) Such macromonomers are known and may be prepared by the methods disclosed by Milkovich et al. in U.S. Pat. Nos. 3,786,116 and 3,842,059, the disclosures of which are incorporated herein by reference for the description of the preparation of the vinyl-terminated macromonomers. As disclosed therein, vinyl terminated macromonomer is prepared by anionic polymerization of polymerizable monomer to form a living polymer. Such monomers include those having an olefinic group, such as the vinyl-containing compounds. Living polymers are conveniently prepared by contacting the monomer with an alkali metal hydrocarbon or alkoxide salt in the presence of an inert organic solvent which does not participate in or interfere with the polymerization process. Monomers which are susceptible to anionic polymerization are well known. Illustrative species include vinyl aromatic compounds such as styrene, alpha-methyl styrene, vinyl toluene and its isomers or non-aromatic vinyl compounds such as methyl methacrylate. Other monomers susceptible to anionic polymerization are also useful.

The purpose of using a copolymerizable macromonomer includes but is not limited to enabling hot-melt coating of the PSA, but increasing the cohesive strength of the cooled extruded sheet PSA by the interaction of the pendant Z moieties on the polymer backbone. The amount of macromonomer used is generally within the range of about 1% to about 30%, preferably about 1% to about 7%, of the total weight of monomers. The optional use of such macromonomers is included within the scope of the present invention. A particular advantage of the present invention is the ability to successfully copolymerize said macromonomers into the polymer backbone. In conventional, lower-temperature isothermal bulk polymerization, as polymerization proceeds, the macromonomer can precipitate out due to the immiscibility of the macromonomer in the accumulating polymer, preventing the necessary polymerization of the macromonomer into the polymer backbone. In the practice of the present invention, because of the elevated temperatures obtained at high conversion, the successful use of free-radically copolymerizable macromonomers has been demonstrated.

Free-Radical Initiators

Many possible thermal free radical initiators are known in the art of vinyl monomer polymerization and may be used in this invention. Typical thermal free radical polymerization initiators which are useful herein are organic peroxides, organic hydroperoxides, and azo-group initiators which produce free radicals. Useful organic peroxides include but are not limited to compounds such as benzoyl peroxide, di-t-amyl peroxide, t-butyl peroxy benzoate, 2,5-dimethyl-2,5 Di-(t-butylperoxy)hexane, 2,5-dimethyl-2,5-Di-(t-butylperoxy) hexyne-3, and di-cumyl peroxide. Useful organic hydroperoxides include but are not limited to compounds such as t-amyl hydroperoxide and t-butyl hydroperoxide. Useful azo-group initiators include but are not limited to the VAZO™ compounds manufactured by DuPont, such as VAZO™ 52 (2,2'-azobis(2,4-dimethylpentanenitrile)), VAZO™ 64 (2,2'-azobis(2-methylpropanenitrile)), Vazo™ 67 (2,2'-azobis(2-methylbutanenitrile)), and VAZO™ 88 (2,2'-azobis(cyclo-hexanecarbonitrile)).

When the initiator(s) have been mixed into the monomers, there will be a temperature above which the mixture begins to react substantially (rate of temperature rise typically greater than about 0.1° C./min for essentially adiabatic conditions). This temperature, which depends on factors including the monomer(s) being reacted, the relative amounts of monomer(s), the particular initiator(s) being used, the amounts of initiator(s) used, and the amount of any polymer and/or any solvent in the reaction mixture, will be defined herein as the "runaway onset temperature". As an example, as the amount of an initiator is increased, its runaway onset temperature in the reaction mixture will decrease. At temperatures below the runaway onset temperature, the amount of polymerization proceeding will be practically negligible. At the runaway onset temperature, assuming the absence of reaction inhibitors and the presence of essentially adiabatic reaction conditions, the free radical polymerization begins to proceed at a meaningful rate and the temperature will start to accelerate upwards, commencing the runaway reaction.

According to the present invention, a sufficient amount of initiator(s) typically is used to carry the polymerization to the desired temperature and conversion. If too much initiator(s) is used, an excess of low molecular weight polymer will be produced thus broadening the molecular weight distribution. Low molecular weight components can degrade the polymer product performance. If too little initiator is used, the polymerization will not proceed appreciably and the reaction will either stop or will proceed at an impractical rate. The amount of an individual initiator used depends on factors including its efficiency, its molecular weight, the molecular weight(s) of the monomer(s), the heat(s) of reaction of the monomer(s), the types and amounts of other initiators included, etc. Typically the total initiator amount used is in the range of about 0.0005 weight % to about 0.5 weight % and preferably in the range of about 0.001 weight % to about 0.1 weight % based on the total weight of monomer(s).

When more than one initiator is used in the reaction, as the first initiator depletes during an essentially adiabatic reaction (with the corresponding increasing reaction temperature), the second initiator may be selected such that it is thermally activated when the first initiator is becoming depleted. That is, as the first initiator is depleting, the reaction has brought the reaction mixture to the runaway onset temperature for the second initiator in the reaction mixture. An overlap is preferred such that before one initiator completely depletes another initiator activates (reaches its runaway onset temperature). Without an overlap, the polymerization rate can slow or essentially stop without external heating to bring the mixture to the runaway onset temperature of the next initiator in the series. This use of external heating defeats one of the benefits of the inventive process by adding the potential for nonuniform temperature distribution in the reaction mixture due to the external heating. However, polymerization still occurs under essentially adiabatic conditions.

Until the temperature increases towards the runaway onset temperature for an individual initiator in the batch, the initiator is essentially dormant, not appreciably decomposing to form free radicals. It will remain dormant until the reaction temperature increases towards its runaway onset temperature in the reaction mixture and/or until external heat is applied.

The succession of one initiator depleting and another reaching its runaway onset temperature can continue as the temperature rises for virtually any number of thermal initiators in the reaction system. In the limit, a succession of virtually an infinite number of different initiators could be used with nearly complete overlap of the active temperature ranges between adjacent initiators in the succession to bring about the polymerization and the corresponding adiabatic temperature rise. In this case, the amount of each initiator used would need to be virtually infinitesimally small so as to not detrimentally broaden the molecular weight distribution.

Practically, to minimize raw material handling requirements, a reasonable minimum number of initiators should be used to achieve the desired amount of adiabatic polymerization and obtain the necessary polymer properties. Typically, 1 to 5 different initiators (more typically 2 to 5) are used during a particular reaction cycle. In some circumstances it may be advantageous to use 2, 3, 4, or 5 different initiators per reaction cycle.

To estimate the amount of overlap between successive initiators in a series during an essentially adiabatic polymerization, standard polymerization modeling techniques can be employed (see, for example, W. H. Ray, "On the Mathematical Modeling of Polymerization Reactors," *J. Macromol. Sci. Macromol. Chem.*, C8(1), 1, 1972).

Alternatively, an essentially adiabatic polymerization can be conducted (for example, using a small-scale adiabatic reaction calorimeter) and the temperature profile can be measured for a particular set of initiators. Based on the known decomposition rates of the initiators and the measured temperature profile, the concentration of each initiator versus time can be calculated. The calculation involves solving the following differential equation for versus time for each initiator i in the essentially adiabatic polymerization (i=1 to n, where n is the number of initiators in the reacting system):

$$\frac{dI_i}{dt} = -k_i I_i$$

Here $I_i$ represents the concentration of initiator i at a given time, t represents time, and k is the temperature dependent decomposition rate constant for initiator i. The rate constant $k_i$ is commonly represented by an Arrhenius relationship of the form $k_i = k_{ref,i} \exp\{-E_{a,i}(1/T - 1/T_{ref})/R\}$, where $E_{a,i}$ is the activation energy of the decomposition of initiator i, T is absolute temperature, $k_{ref,i}$ is the decomposition rate coefficient at a chosen reference temperature such as $T_{ref}=294$ K, and R is the Universal gas constant. For clarity, the index i for each initiator will be defined to be numbered 1 through n ordered by lowest temperature to highest temperature for each initiator i which produces a one-hour half life. The constants $E_{a,i}$ and $k_{ref,i}$ can be estimated from knowing the temperature-dependent decomposition characteristics of initiator i, data commonly available from commercial manufacturers of free radical initiators. For example, from knowing the half-life of initiator i at two different temperatures, $E_{a,i}$ and $k_{ref}$ can be estimated. Once $I_i$ is calculated versus time, multiplying $I_i$ at each time by $k_i$ at that time can be used to determine $$-\left(\frac{dI_i}{dt}\right)$$

versus time by direct substitution in the rate equation for initiator decomposition. Plotting $$-\left(\frac{dI_i}{dt}\right)$$

versus temperature illustrates the temperature overlap ranges of each initiator.

In the method of the present invention, a preferred minimum and maximum overlap of the active temperature ranges of two or more initiators during an essentially adiabatic reaction will be as follows.

It is preferred that prior to the $$-\left(\frac{dI_i}{dt}\right)$$

for at least one (preferably each) initiator i ($i \leq n-1$, $n>1$, where $i=1, \ldots, n$) decreasing to about 10% of its maximum value, the value of $$-\left(\frac{dI_{i+1}}{dt}\right)$$

for the next initiator to reach it runaway onset temperature in the series will increase to at least about 20% of its maximum value, as the reaction temperature increases due to essentially adiabatic polymerization. In reacting in this manner, the essentially adiabatic polymerization will proceed without the need for heating between the runaway onset temperatures of the initiators. It is preferred that prior to the $$-\left(\frac{dI_i}{dt}\right)$$

for at least one (preferably each) initiator i in a series ($i>1$, $n>1$, where $i=1, \ldots, n$) reaching about 30% of its maximum value, the previous initiator in the series has already reached its maximum value of $$-\left(\frac{dI_{i-1}}{dt}\right),$$

as the reaction temperature increases due to essentially adiabatic polymerization. In reacting in this manner, the number of initiators used will be kept at a reasonable minimum number.

A particular initiator used is selected based upon its thermal decomposition characteristics. For example, di-cumyl peroxide and di-t-amyl peroxide have similar temperature decomposition characteristics to produce free radicals (that is, similar half-lives at various temperatures) and may be reasonable substitutes for each other in some instances. Apart from the temperature decomposition characteristics, other considerations in initiator selection may include an initiator's toxicity, cost, and potential side reactions in the polymerization system (such as minimizing undesired crosslinking of the polymer).

Typical initiators, in the order that they become activated as the temperature increases, include: Vazo™ 52 (2,2'-azobis(2, 4-dimethylpentanenitrile)), Vazo™ 88 (2,2'-azobis(cyclohexanecarbonitrile)), di-t-amyl peroxide, and t-amyl hydroperoxide. These initiators, for common monomers being reacted, typically are "spaced" in their temperature decomposition characteristics to overlap sufficiently to perform adiabatic polymerization without the need for external heating. Different, or additional, initiators may be necessary, depending on the monomer(s) employed. Factors affecting the initiator(s) employed include but are not limited to the rate of reaction of the monomer(s), the heat of reaction of the monomers, and the heat capacity of the reaction mixture.

In the case that there will be more than one reaction cycle, the initiator(s) for the first essentially adiabatic reaction cycle are typically selected to bring the reaction to a temperature/ conversion level where the polymerization reaction virtually stops when the initiator(s) have essentially depleted (that is, initiator(s) are more than 99% depleted) and where the solution viscosity is such that when the reaction mixture is cooled prior to the next reaction cycle, the next initiator(s), optional chain transfer agent, optional additional monomers, optional polymer, etc., can be mixed into the batch. This viscosity will be typically less than about 200,000 centipoise (Brookfield viscosity at mixing temperature) for a common batch reactor system.

Scavenger Monomer

Scavenger monomers are employed in the present invention to reduce the undesirable residual primary monomer content in the polymer compositions. The scavenger monomers preferentially react with residual unreacted vinyl monomers to reduce the residual primary vinyl monomer content to an acceptable level. The scavenger monomers react more slowly than the primary monomers such that the scavenger monomer typically remains in excess.

Typically, scavenger monomer is selected so that the reactivity ratio of any other monomer in the system to the scavenger monomer ($r_m/r_s$) is between about 5 and about 5,000 (preferably between about 20 and about 2,000) within the range of reaction conditions.

Preferably, the scavenger monomer has low toxicity and no objectionable odor. It can also be desirable that the scavenger monomer be removable (for example, by volatilization).

Preferred scavenger monomers can be selected from the group consisting of:

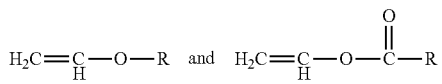

wherein R is a $C_1$-$C_{18}$ alkyl group.

Useful scavenger monomers depend upon the other monomers in the system, but can include, for example, vinyl acetate, vinyl propionate, vinyl butyrate, vinyl valerate, vinyl caproate, vinyl heptylate, vinyl caprylate, vinyl pelargonate, vinyl laurate, vinyl stearate, vinyl benzoate, vinyl pivalate, vinyl neononanoate, vinyl neodecanoate, vinyl neoundecanoate, vinyl-2-ethylhexanoate, ethyl vinyl ether, propyl vinyl ether, butyl vinyl ether, pentyl vinyl ether, hexyl vinyl ether, and 2-ethyl hexyl vinyl ether.

The amount of scavenger monomer is selected to be in excess of that sufficient to react substantially all of the residual monomer. Typically, the scavenger monomer is added at a level of about 1% to about 15% by weight, based upon the total weight of the other monomers (preferably, at a level of about 2% to about 8%; more preferably at a level less than about 5%).

Chain Transfer Agents

Chain transfer agents, which are well known in the polymerization art, may also be included to control the molecular weight or other polymer properties. The term "chain transfer agent" as used herein also includes "telogens". Suitable chain transfer agents for use in the inventive process include but are not limited to those selected from the group consisting of carbon tetrabromide, hexanebromoethane, bromotrichloromethane, 2-mercaptoethanol, t-dodecylmercaptan, isooctylthioglycoate, 3-mercapto-1,2-propanediol, cumene, and mixtures thereof. Depending on the reactivity of a particular chain transfer agent and the amount of chain transfer desired, typically 0 to about 5 percent by weight of chain transfer agent is used, preferably 0 to about 0.5 weight percent, based upon the total weight of monomer(s).

Crosslinking

Crosslinking may also be used in the method of the invention. For example, in the art of hot-melt PSA manufacture, PSAs often require a curing step after they have been extruded in sheet form in order to give them good bond strength and toughness. This step, known as post curing, usually comprises exposing the extruded sheet to some form of radiant energy, such as electron beam, or ultraviolet light with the use of a chemical crosslinking agent.

Examples of suitable crosslinking agents include but are not limited to those selected from the groups consisting of hydrogen abstraction type photocrosslinkers such as those based on benzophenones, acetophenones, anthraquinones, and the like. These crosslinking agents can be copolymerizable or non-copolymerizable.

Examples of suitable non-copolymerizable hydrogen abstraction crosslinking agents include benzophenone, anthraquinones, and radiation-activatable crosslinking agents such as those described in U.S. Pat. No. 5,407,971. Such agents have the general formula

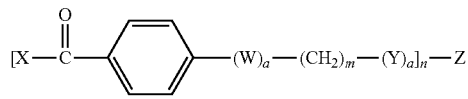

wherein W represents —O—, —N—, or —S—; X represents $CH_3$— or phenyl; Y represents a ketone, ester, or amide functionality; Z represents a polyfunctional organic segment that contains no hydrogen atoms more photoabstractable than hydrogen atoms of a polymer formed using the crosslinking agent; m represents an integer from 0 to 6; "a" represents 0 or 1; and n represents an integer 2 or greater. Depending on the amount of crosslinking desired and the efficiency of the particular crosslinker used, non-copolymerizable crosslinking agents are typically included in the amount of about 0% to about 10%, and preferred in the range of about 0.05% to about 2%, based on total weight of the monomer(s).

Examples of suitable copolymerizable hydrogen abstraction crosslinking compounds include mono-ethylenically unsaturated aromatic ketone monomers free of orthoaromatic hydroxyl groups.

Examples of suitable free-radically copolymerizable crosslinking agents include but are not limited to those selected from the group consisting of 4-acryloxybenzophenone (ABP), para-acryloxyethoxybenophenone, and para-N-(methacryloxyethyl)-carbamoylethoxybenzophenone. Copolymerizable chemical cross linking agents, are typically included in the amount of about 0% to about 2%, and preferred in the amount of about 0.025% to about 0.5%, based on the total weight of monomer(s). Other useful copolymerizable crosslinking agents are described in U.S. Pat. No. 4,737,559.

Solvents

In many cases, free-radical polymerization can take place without solvents, that is, true bulk polymerization where the polymer formed as well as the monomers themselves all being miscible. However, the monomers may in some cases require a solvent in order to (co)polymerize. For example, acrylamides are dissolved in a small amount of solvent in order to make them miscible with isooctyl acrylate. Therefore, the inventive process includes within its scope the use of solvents that are nonreactive in the free radical polymerization being carried out. *Such solvents usually comprise less than about* 20 weight percent based on the total weight of the mixture. Useful solvents are those that are miscible in the mixture including but not limited to organic solvents such as toluene, hexane, pentane, and ethyl acetate. Solvents may also enhance the inventive process, so as to reduce the viscosity of the polymer at the end of the polymerization to facilitate draining or subsequent processing. Typically, however, solvent must be removed from the end product.

Optional Polymer

Optionally, polymer may be dissolved in the reaction mixture prior to the first essentially adiabatic reaction cycle. Alternatively and/or in addition the optional polymer may be included in subsequent essentially adiabatic reaction cycles. Such polymer may be included to modify the molecular weight distribution, molecular weight, or properties of the final polymer product after reacting is complete and generally will be non-reactive during the polymerization of the inventive process. Although it is not required, the polymer generally will be composed of the same monomer(s) as that to be reacted in the reaction mixture comprising the polymer, monomer(s), initiator(s), optional chain transfer agent(s), etc. Polymer dissolved in the monomer(s) prior to the first reaction cycle typically will be included in the range of about 0% to about 50% by weight and preferably less than about 0% to about 30% by weight, based on total weight of monomer(s) plus polymer. The use of polymer syrups to make acrylic polymers is explained, for example, in U.S. Pat. No. 4,181, 752.

Method

Typical reaction(s) with the inventive process proceed as follows. The monomer(s) are charged to the reactor in the desired amount(s). The temperature of the reaction vessel must be cool enough so that virtually no thermal polymerization of the monomer(s) will occur and also cool enough so that virtually no polymerization will occur when the initiator(s) are added to the batch. Also, care should be taken to ensure the reactor is dry, in particular, free of any undesired volatile solvent (such as reactor cleaning solvent), which potentially could dangerously elevate the pressure of the reaction vessel as the temperature increases due to heat of polymerization. The initiator(s), optional chain transfer agents, optional polymer, optional crosslinking agents, optional solvent, etc., are also charged to the reactor. If scavenger monomer is being added in the first reaction cycle of the two-step (or multi-step) reaction, it is also charged to the reactor.

Prior to warming the reaction mixture as described below (or optionally simultaneously while warming the batch), after adding all components to the batch as described above, the batch is purged of oxygen. De-oxygenation procedures are well known to those skilled in the art of free-radical polymerization. For example, de-oxygenation can be accomplished by bubbling an inert gas such as nitrogen through the batch to displace dissolved oxygen.

After completing the de-oxygenation, the head space in the reactor is typically pressurized with an inert gas such as nitrogen to a level necessary to suppress boiling of the reaction mixture as the temperature rises during reaction. The inert gas pressure also prevents oxygen from entering the polymerization mixture through possible small leaks in the reaction equipment while polymerization is in progress.

From heating provided by a jacket on the reactor, the reaction mixture temperature typically is raised to or in a range about 1° C. to about 5° C. above the runaway onset temperature with sufficient mixing in the batch to have an essentially uniform temperature in the batch. A batch temperature controller is typically set temporarily to maintain the batch at the runaway onset temperature. Once the jacket temperature begins to drop as necessary to hold the batch at the runaway onset temperature, this indicates that the polymerization has begun. The reaction may not proceed immediately when the batch is brought to the runaway onset temperature because it may take time to deplete reaction inhibitors that are typically shipped with the monomer (to prevent unwanted polymerization during shipping and handling), other trace impurities, or any oxygen still dissolved in the reaction mixture. As soon as the jacket temperature drops, the reactor jacket temperature control system is typically set to track the batch temperature as it increases, due to reaction, to facilitate essentially adiabatic reaction conditions. In the practice of the inventive process, it has been found beneficial to have the jacket track about 1° C. to about 10° C. above the batch to warm the reactor walls from the jacket as opposed to warming the reactor walls from the heat of reaction of the mixture, making the reacting system more adiabatic. It is acknowledged that perfect adiabiticity is probably not attainable because there will typically be a small amount of heat transferred from the reacting medium to the internal agitator blades and shaft as well as the mixing baffles in the reactor. In the practice of this invention the effect of heat loss to heating the agitator shaft and blades, baffles, temperature probes, etc., has been found to be negligible.

An alternate heating approach can be to gently warm the batch past the runaway onset temperature with heat input from the jacket to warm the batch at a rate of about 0.1° C./min to about 0.5° C./min and continue the heating through the reaction cycle (similar to the heating approach above with the jacket tracking about 1° C. to about 10° C. above the batch temperature). As in the heating approach above, continued heating through the reaction cycle would serve to offset the heat loss to the reaction equipment and maintain essentially adiabatic reaction conditions.

Once the reaction temperature has peaked, due to the depletion of the thermal initiator(s) as well as negligible reaction of the monomers from thermal polymerization, the polymer content at this point is typically about 30-80% by weight based on the total weight of monomer(s) and polymer.

The polymerization cycle can be stopped at this point. Typically, the batch temperature is cooled prior to beginning the next reaction cycle. Generally the batch is cooled about 0-20° C. below the runway onset temperature of the initiator used in the next reaction cycle. If more than one initiator is used the batch temperature is typically cooled at least about 0-20° C. below the runway onset temperature of the initiator having the lowest runaway onset temperature.

As the partially polymerized reaction mixture cools, its viscosity will increase. Optionally, if necessary, additional monomer(s) can be added to the batch before it has fully cooled to compensate for the increasing viscosity. Typically, if necessary, a relatively small amount will be added. Charging additional monomer in the amount less than about 30 weight % of the amount of monomer added in the first reaction cycle is preferred. While the batch is cooling or when it has cooled to the desired temperature, optionally more monomer(s) can be added to adjust monomer ratios to compensate for unequal reactivity ratios of the monomers in the previous reaction cycle. Similarly, monomer(s) not included in an earlier reaction cycle can be added to tailor the polymer properties as needed. Monomer addition may also be performed as an in-process correction to compensate for slight batch-to-batch variations in the amount of reaction conversion obtained in a previous reaction cycle.

When the batch has cooled to the desired temperature, the additional initiator(s) are added to the batch. Scavenger monomer is also added at this time if it was not added in the first reaction cycle or while cooling after the previous reaction cycle. Optionally, additional chain transfer agent(s) can be added. Adjusting the amount of chain transfer agent can provide an in-process correction for the product molecular weight obtained from the previous reaction cycle. Other additives, including optional photocrosslinking agents, optional polymer, optional solvent, etc., can also be added at this time.

The batch is de-oxygenated, warmed to the runway onset temperature of the initiator having the lowest runaway onset temperature, and reacted essentially adiabatically as described above for the previous reaction cycle. If necessary, additional reaction cycles can be performed to continue increasing conversion to the desired level, optionally with more scavenger monomer being added.

Optionally additives including but not limited to those selected from the group consisting of plasticizers, tackifiers, antioxidants, stabilizers, and mixtures thereof, can be added at this time by mixing one or more of them into the molten polymer product. The identity and relative amounts of such components are well known to those skilled in the art. For example, the antioxidant/stabilizer Irganox™ 1010 (tetrakis (methylene(3,5-di-tert-butyl-4-hydroxyhydrocinnamate)) methane), manufactured by Ciba-Geigy Corporation, can be mixed into the polymer to increase the temperature stability of the polymer. Antioxidant is typically used in the range of about 0.01% to about 1.0% based on the total weight of the polymer product.

The reaction mixture's viscosity at the temperature at the end of the final reaction cycle is preferably less than about 200,000 to about 500,000 centipoise (Brookfield viscosity at draining temperature) to permit draining of the molten polymer from the reactor and optionally mixing additives into the batch. Typically, inert gas (such as nitrogen) pressure in the head space of the reactor can be used to hasten the draining of the product from the reactor.

After the reaction mixture is drained, an apparatus such as an extractor-extruder can be used to strip unreacted monomer and/or any solvent that optionally was added to the batch, or further process the polymer by mixing in additives comprising plasticizers, tackifiers, antioxidants and/or stabilizers, and extruding the polymer into the physical form that it is intended to be used (i.e. in sheet form for a PSA).

EXAMPLES

Objects and advantages of this invention are further illustrated by the following examples, but the particular materials and amounts thereof recited in these examples, as well as other conditions and details, should not be construed to unduly limit this invention.

Materials

| Designator | Name | Availability |
|---|---|---|
| VAZO 52 | 2,2'-azobis(2,4-dimethylpentanenitrile) | Dupont, Wilmington, DE |
| VAZO 88 | 2,2'-azobis(cyclohexane-carbonitrile) | Dupont, Wilmington, DE |
| IRGANOX 1010 | tetrakis(methylene(3,5-di-tert-butyl-4-hydroxy-hydrocinnamate))methane | Ciba Specialty Chemicals, Tarrytown, NY |
| LUPERSOL 101 | 2,5-dimethyl-2,5 Di-(t-butylperoxy)hexane | Elf Atochem, Philadelphia, PA |
| LUPERSOL 130 | 2,5-dimethyl-2,5-Di-(t-butylperoxy)hexyne-3 | Elf Atochem, Philadelphia, PA |
| AA | Acrylic Acid | Dow Chemical, Midland, MI |
| EA | Ethyl acrylate | EMD Chemicals Inc, Gibbstown, NJ |
| MA | Methyl acrylate | Dow Chemical, Midland, MI |
| IOA | Isooctyl acrylate | 3M Company, St. Paul, MN |
| ABP | 4-acryloxy benzophenone | Prepared according to U.S. Pat. No. 4,737,559 |
| IOTG | Isooctylthioglycoate | Dow Chemical, Midland, MI |
| VEOVA-11 | vinyl neoundecanoate | Resolution Performance Products, Houston, TX |
| | Vinyl acetate | Celanese, Dallas, TX |
| | tert-butyl vinyl ether | Aldrich, St. Louis, MO |
| | 2-ethylhexyl vinyl ether | Aldrich, St. Louis, MO |
| MMA | Methyl methacrylate | Rohm and Haas, Philadelphia, PA |
| SR313 | n-Laurel methacrylate | Sartomer, West Chester, PA |

Examples 1-5 and Comparative Examples 1-3

The polymerization of IOA/AA (95/5) was carried out by a two step reaction using a VSP2 adiabatic reaction apparatus equipped with a 316 stainless steel test can (available from Fauske and Associates Inc, Burr Ridge Ill.). A variety of scavenger monomers were added in either the first step or in the second step.

In the first step of the polymerization, the VSP2 reactor was charged with 70 grams of a mixture consisting of 0.1 grams IRGANOX 1010; 93.01 grams IOA; 5.0 grams AA; 0.8 grams of a mixture consisting of 0.1 grams VAZO 52 and 80.0 grams IOA; 1.105 grams of a mixture consisting of 5.0 grams IOTG and 80.0 grams IOA; 0.4 grams ABP (25% by weight in IOA). To this charge, a scavenger monomer in the amount designated in Table 1 below was added. The reactor was sealed and purged of oxygen. The reaction mixture was heated to 60 degrees C. and the reaction proceeded adiabatically. Typical reaction peak temperature was 150 degrees C. When the reaction was complete, the mixture was cooled to below 50 degrees C.

To the reaction product of the first step was added 0.7 grams of a mixture consisting of 1.625 grams IOTG, 0.5 grams VAZO 52, 0.2 grams VAZO 88, 0.15 grams LUPERSOL 101, 0.6 grams LUPERSOL 130, 46.93 grams EA; 0.25 grams ABP (25% by weight in IOA; an amount of scavenger monomer as designated in Table 1 below. The reactor was sealed and purged of oxygen. The reaction mixture was heated to 60 degrees C. and the reaction proceeded adiabatically. Typical reaction peak temperature was 150 degrees C. When the reaction was complete, the mixture was cooled and residual monomer amounts were measured using gas chromatography. The results are shown in Table 1 below.

TABLE 1

| Example | Scavenger Monomer | Scavenger Amount (parts by weight) | Reaction Step Added | % Residual IOA | % Residual AA | % Residual Scavenger Monomer |
|---|---|---|---|---|---|---|
| Comparative Example 1 | None | — | — | 1.190 | 0.293 | — |
| Comparative Example 2 | MMA | 5 | 2 | 0.967 | 0.406 | none |
| Comparative Example 3 | SR313 | 5 | 2 | 1.110 | 0.168 | 1.30% |
| Example 1 | Vinyl Acetate | 5 | 2 | 0.550 | 0.256 | 0.54% |
| Example 2 | Vinyl Acetate | 5 | 1 | 0.632 | 0.286 | 0.30% |
| Example 3 | tert-butyl vinyl ether | 5 | 2 | 0.517 | 0.238 | 1.24% |
| Example 4 | 2-ethylhexyl vinyl ether | 5 | 2 | 0.734 | 0.249 | 2.23 |
| Example 5 | Veova-11 | 5 | 2 | 0.284 | 0.109 | 1.3 |

Example 6 and Comparative Example 4

The polymerization of IOA/MA/AA (70/22.5/7.5) was carried out by a two step reaction using a VSP2 adiabatic reaction apparatus equipped with a 316 stainless steel test can (available from Fauske and Associates Inc, Burr Ridge Ill.). A variety of scavenger monomers were added in either the first step or in the second step.

In the first step of the polymerization, the VSP2 reactor was charged with 70 grams of a mixture consisting of 0.1 grams IRGANOX 1010; 64.47 grams IOA; 7.5 grams AA; 22.5 grams MA; 4.01 grams of a mixture consisting of 0.1 grams VAZO 52 and 80.0 grams IOA; 1.615 grams of a mixture consisting of 5.0 grams IOTG and 80.0 grams IOA; 0.3 grams ABP (25% by weight in IOA). The reactor was sealed and purged of oxygen. The reaction mixture was heated to 60 degrees C. and the reaction proceeded adiabatically. Typical reaction peak temperature was 170 degrees C. When the reaction was complete, the mixture was cooled to below 50 degrees C.

To the reaction product of the first step was added 0.7 grams of a mixture consisting of 2.85 grams IOTG, 0.5 grams VAZO 52, 0.2 grams VAZO 88, 0.2 grams LUPERSOL 101, 0.2 grams LUPERSOL 130, 46.05 grams EA; 0.63 grams ABP (25% by weight in IOA; an amount of scavenger monomer as designated in Table 2 below. The reactor was sealed and purged of oxygen. The reaction mixture was heated to 60 degrees C. and the reaction proceeded adiabatically. Typical reaction peak temperature was 170 degrees C. When the reaction was complete, the mixture was cooled and residual monomer amounts were measured using gas chromatography. The results are shown in Table 2 below.

TABLE 2

| Example | Scavenger Monomer | Scavenger Amount (parts by weight) | Reaction Step Added | % Residual IOA | % Residual MA | % Residual AA | % Residual Scavenger Monomer |
|---------|-------------------|-----------------------------------|---------------------|----------------|---------------|---------------|------------------------------|
| Comparative Example 4 | None | — | — | 1.230 | 0.187 | 0.388 | — |
| Example 6 | Vinyl Acetate | 5 | 2 | 0.658 | 0.116 | 0.324 | 0.72 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

I claim:

1. A method of free radically polymerizing vinyl monomers comprising:
   (a) providing a non-heterogeneous mixture comprising:
      (i) free radically (co)polymerizable vinyl monomers,
      (ii) at least one thermal free radical initiator, and
      (iii) a scavenger monomer selected from the group consisting of:

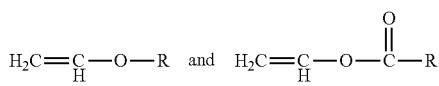

wherein R is a $C_1$-$C_8$ alkyl group,
in a batch reactor, wherein the non-heterogeneous mixture of step (a) further comprises a solvent miscible in the non-heterogeneous mixture, wherein the solvent miscible in the non-heterogeneous mixture of step (a) is present in the non-heterogeneous mixture in an amount less than 20% by weight based on the total weight of the non-heterogeneous mixture of step (a);
   (b) deoxygenating the non-heterogeneous mixture if the mixture is not already deoxygenated;
   (c) heating the non-heterogeneous mixture to a sufficient temperature to generate sufficient initiator radicals from at least one thermal free radical initiator so as to initiate polymerization;
   (d) allowing the non-heterogeneous mixture to polymerize under essentially adiabatic conditions to yield an at least partially polymerized non-heterogeneous mixture;
   (e) adding additionally to the at least partially polymerized non-heterogeneous mixture at least one thermal free radical initiator;
   (f) deoxygenating the partially polymerized non-heterogeneous mixture if the mixture is not already deoxygenated; and
   (g) allowing the partially polymerized non-heterogeneous mixture to further polymerize under essentially adiabatic conditions to yield a molten polymer;
wherein an additional scavenger monomer selected from the group consisting of:

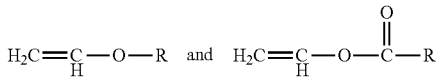

wherein R is a $C_1$-$C_8$ alkyl group, is added additionally to the at least partially polymerized non-heterogeneous mixture of step (d).

2. The method of claim 1 wherein the free radically polymerizable monomers are selected from the group consisting of monofunctional unsaturated acrylate esters of a non-tertiary alkyl alcohol wherein the alkyl group contains about 1 to about 18 carbon atoms, N-vinyl pyrrolidone, N,N-dimethyl acrylamide, acrylic acid, acrylamide, N-octyl acrylamide, 2-methyl butyl acrylate, styrene, alpha methyl styrene, and mixtures thereof.

3. The method of claim 1 wherein the thermal free radical initiator(s) are selected from the group consisting of organic peroxides, organic hydroperoxides, azo-group initiators, and mixtures thereof.

4. The method of claim 1 wherein the scavenger monomer is selected so that the reactivity ratio of any other monomer to the scavenger monomer ($r_m/r_s$) is between about 5 and about 5,000 within the range of reaction conditions.

5. The method of claim 1, wherein the free radically (co)polymerizable vinyl monomers comprise at least one of iso-octyl acrylate and 2-ethylhexyl acrylate, the scavenger monomer is vinyl acetate, and the additional scavenger monomer is vinyl acetate.

6. The method of claim 1 wherein the scavenger monomer is added at a level such that it remains in excess when the other monomers are essentially fully reacted.

7. The method of claim 1 wherein the amount of scavenger monomer added to the non-heterogeneous mixture of step (a) and the amount of scavenger monomer added additionally to the at least partially polymerized mixture of step (d), comprises less than 5% by weight of the total weight of the other monomers in the non-heterogeneous mixture of step (a).

8. The method of claim 1 further comprising cooling the at least partially polymerized non-heterogeneous mixture of step (d) before proceeding to step (e).

9. The method of claim 1 further comprising additionally adding to the partially polymerized non-heterogeneous mixture of step (e) free radically polymerizable monomers, crosslinking agent, chain transfer agent, or polymer comprising polymerized free radically polymerizable monomers, or any combination thereof.

10. The method of claim 1 further comprising repeating steps (e)-(g) one or more times.

11. A method of free radically polymerizing vinyl monomers comprising:
(a) providing a non-heterogeneous mixture comprising:
  (i) free radically (co)polymerizable vinyl monomers comprising iso-octyl acrylate,
  (ii) at least one thermal free radical initiator, and
  (iii) a scavenger monomer selected from the group consisting of:

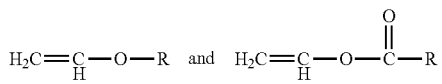

wherein R is a $C_1$-$C_8$ alkyl group,
in a batch reactor, wherein the non-heterogeneous mixture of step (a) further comprises a solvent miscible in the non-heterogeneous mixture, wherein the solvent miscible in the non-heterogeneous mixture of step (a) is present in the non-heterogeneous mixture in an amount less than 20% by weight based on the total weight of the non-heterogeneous mixture of step (a);
(b) deoxygenating the non-heterogeneous mixture if the mixture is not already deoxygenated;
(c) heating the non-heterogeneous mixture to a sufficient temperature to generate sufficient initiator radicals from at least one thermal free radical initiator so as to initiate polymerization;
(d) allowing the non-heterogeneous mixture to polymerize under essentially adiabatic conditions to yield an at least partially polymerized non-heterogeneous mixture;
(e) adding additionally to the at least partially polymerized non-heterogeneous mixture at least one thermal free radical initiator;
(f) deoxygenating the partially polymerized non-heterogeneous mixture if the mixture is not already deoxygenated; and
(g) allowing the partially polymerized non-heterogeneous mixture to further polymerize under essentially adiabatic conditions to yield a molten polymer;
wherein an additional scavenger monomer selected from the group consisting of:

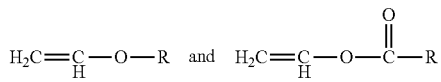

wherein R is a $C_1$-$C_8$ alkyl group, is added additionally to the at least partially polymerized non-heterogeneous mixture of step (d).

12. The method of claim 11 wherein the free radically polymerizable monomers are selected from the group consisting of monofunctional unsaturated acrylate esters of a non-tertiary alkyl alcohol, wherein the alkyl group contains about 1 to about 18 carbon atoms, N-vinyl pyrrolidone, N,N-dimethyl acrylamide, acrylic acid, acrylamide, N-octyl acrylamide, 2-methyl butyl acrylate, styrene, alpha methyl styrene, and mixtures thereof.

13. The method of claim 11 wherein the thermal free radical initiator(s) are selected from the group consisting of organic peroxides, organic hydroperoxides, azo-group initiators, and mixtures thereof.

14. The method of claim 11 wherein the scavenger monomer is selected so that the reactivity ratio of any other monomer to the scavenger monomer ($r_m/r_s$) is between about 5 and about 5,000 within the range of reaction conditions.

15. The method of claim 11, wherein the free radically (co)polymerizable vinyl monomers are a mixture of methyl acrylate, iso-octyl acrylate and acrylic acid, and the additional scavenger monomer is vinyl acetate.

16. The method of claim 11 wherein the scavenger monomer is added at a level such that it remains in excess when the other monomers are essentially fully reacted.

17. The method of claim 11 wherein the amount of scavenger monomer added to the non-heterogeneous mixture of step (a) and the amount of scavenger monomer added additionally to the at least partially polymerized mixture of step (d), comprises less than 5% by weight of the total weight of the other monomers in the non-heterogeneous mixture of step (a).

18. The method of claim 11 further comprising cooling the at least partially polymerized non-heterogeneous mixture of step (d) before proceeding to step (e).

19. The method of claim 11 further comprising additionally adding to the partially polymerized non-heterogeneous mixture of step (e) free radically polymerizable monomers, crosslinking agent, chain transfer agent, or polymer comprising polymerized free radically polymerizable monomers, or any combination thereof.

20. The method of claim 11 further comprising repeating steps (e)-(g) one or more times.

* * * * *

UNITED STATES PATENT AND TRADEMARK OFFICE
CERTIFICATE OF CORRECTION

PATENT NO. : 8,263,718 B2
APPLICATION NO. : 13/159515
DATED : September 11, 2012
INVENTOR(S) : Mark F. Ellis It is certified that error appears in the above-identified patent and that said Letters Patent is hereby corrected as shown below:

In the Specification

Column 8
Line 53, before "versus" and insert --$l_i$--
Line 62, delete "k" and insert --$k_i$--

Column 9
Line 11, delete "$k_{ref}$," and insert --$k_{ref,i}$--

Column 11
Lines 38-39, delete "isooctylthioglycoate" and insert --isooctylthioglycolate--

Column 12
Line 26, delete "acryloxyethoxybenophenone" and
   insert --acryloxyethoxybenzophenone--
Line 27, delete "carbamoylethoxybenophenone" and
   insert --carbamoylethoxybenzophenone--

Colum 13
Line 64, delete "adiabiticity" and insert --adiabaticity--

Column 15
Line 53, delete "Isooctylthioglycoate" and insert --Isooctylthioglycolate--

Signed and Sealed this
Tenth Day of December, 2013

Margaret A. Focarino
*Commissioner for Patents of the United States Patent and Trademark Office*